No. 897,396. PATENTED SEPT. 1, 1908.
W. Z. PIERCE.
TRAP.
APPLICATION FILED AUG. 19, 1907.

WITNESSES:
Flynn Davis
Lelau Lewis.

INVENTOR
William Z. Pierce,
BY
ATTORNEY

UNITED STATES PATENT OFFICE.

WILLIAM Z. PIERCE, OF DEXTER, TEXAS.

TRAP.

No. 897,396.  Specification of Letters Patent.  Patented Sept. 1, 1908.

Application filed August 19, 1907. Serial No. 389,101.

*To all whom it may concern:*

Be it known that I, WILLIAM Z. PIERCE, a citizen of the United States, residing at Dexter, in the county of Cooke and State of Texas, have invented certain new and useful Improvements in Traps, of which the following is a specification.

My invention relates to new and useful improvements in animal traps.

The object of the invention is to provide what is known as a "live" trap in which an animal is caught without injury. The more essential object being to construct such a trap of suitable wire in a novel and simple manner.

A further and equally as important feature resides in the provision of gates and entrances on all sides of the trap by which the animal may readily enter but through which he cannot possibly escape.

Finally, the object of the invention is to provide a device of the character described that will be strong, durable and efficient, and comparatively inexpensive to construct and one in which the several parts will not be liable to get out of working order.

Figure 1:
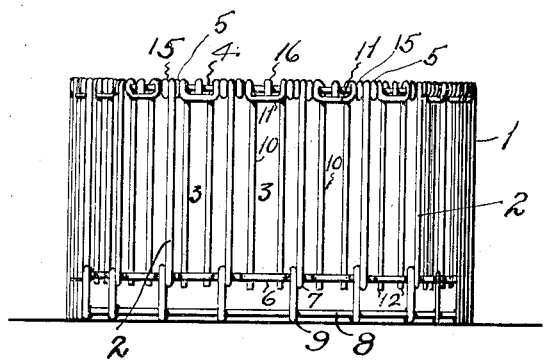
Figure 2:
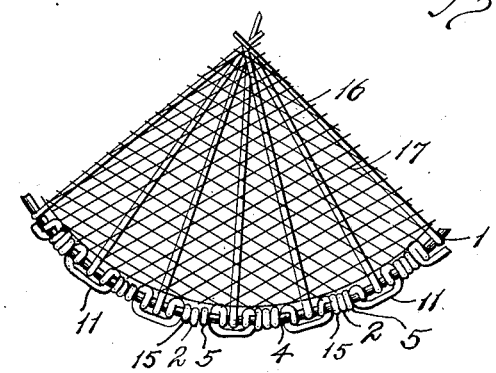
Figure 3:
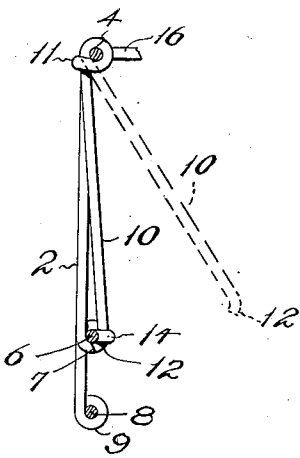
Figure 4:
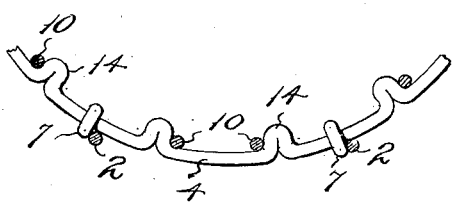

With the above and other objects in view, the invention has particular relation to certain novel features, an example of which is described in the specification and illustrated in the accompanying drawings, wherein:

Figure 1 is an elevation of the improved trap, Fig. 2 is a partial plan view, Fig. 3 is a vertical section through one end of the entrance, and Fig. 4 is a partially horizontal sectional view taken just above the stop wire.

In the drawings, the numeral 1 designates the trap proper, which, it is understood, while being shown in cylindrical form, may assume various shapes, as the occasion may require. I prefer to form the sides of the trap of a plurality of vertical wires 2 equally spaced, so as to provide vertical entrances 3 on each side of each wire. In forming the trap the wires 2 are coiled about a top ring 4 to the right, as indicated at 5 in Figs. 1 and 2. From this point the wires are carried down and coiled about a stop ring 6, as indicated at 7, the lower end of the wire being finally coiled about a bottom ring 8, as indicated at 9. The rings 4, 6, and 8 are preferably of the same diameter, the rings 6 and 8 being sufficiently close to prevent the passage of the animal there-between, thus compelling him to enter the trap through one of the entrances 3. In each entrance 3 a gate 10 is hung, being composed of a single piece of wire looped about the ring 4, as indicated at 11, and its free end turned inward, and projecting down beyond the stop ring 6, as clearly shown in Fig. 1. In this way the vertical wires of the gate are separated, but the space there-between, or between the gate and the vertical wires 2, is of such size as to prevent the passage of the animal. The lower ends of the gate wires are curved outward, as indicated at 12, so as to engage about the inner side of the ring 6, it being noted that the gate inclines a little inward and rests against the inner side of the stop ring, so that while easily pushed inward, cannot be pushed outward, and owing to its inclined position has a tendency to swing outward, thereby lying in close contact with the ring. The stop ring is bent to form inwardly extending lugs or guards 14 between which the gate stands, and which prevent spreading of the lower ends of the gate wires.

It will be noted that each gate, while free to swing on the ring 4, is held against lateral displacement thereon by the extended coil 5 on one side and a short coil 15 lying between the other side and the adjacent vertical wire 2. The trap is braced by diametrical wires 16 extending across the top thereof, and having their ends coiled about the ring 4. A suitable cover as a wire netting or fabric 17 is secured on these wires, thus preventing the escape of the captured animal. The trap may be secured on the ground or other support, and the provision of a bottom therefor is optional.

In practice the trap may, as above stated, be of any shape and size. The bait may be placed in the center of the trap in any convenient way. The animal thus being attracted, seeks to enter the trap and finally pushes one of the gates 10 inward and passes into the trap through the entrance 3. After he has passed from under the gate the same swings outward against the stop ring, thus cutting off his escape. As above explained, it is impossible for the animal to push the gate outward or spread the wires of same, so that he is captured without injury.

While I have shown and described the trap as being composed of wire, it is obvious that other materials might be used which, while not causing a deviation from the principle involved, might cause slight changes in the construction.

What I claim, is:

1. In a wire trap, a top ring, a stop ring, vertical wire supports coiled about the rings and supporting the same, a plurality of wire gates each formed of a single piece of wire looped about the top ring and bearing against the stop ring at its lower end.

2. In a trap, a top ring, a stop ring, vertical wire supports coiled about the said rings and supporting the same, and gates swingingly mounted on the top ring and having their lower ends bearing against the inside of the stop ring.

3. In a wire trap, a top ring, a stop ring, a plurality of wire gates swingingly mounted on the ring and having their lower ends bearing against the stop ring, and vertical wire supports for the rings coiled about the same on each side of each gate.

In testimony whereof I have signed my name to this specification in the presence of two subscribing witnesses.

WILLIAM Z. PIERCE.

Witnesses:
 GEO. P. BARCLAY,
 J. A. TIPPS.